United States Patent [19]
Harrsen et al.

[11] Patent Number: 4,651,331
[45] Date of Patent: Mar. 17, 1987

[54] METHOD OF AND DEVICE FOR ACOUSTICALLY COUNTING PARTICLES

[75] Inventors: Jan Harrsen, Ellerau; Franz Grosse-Scharmann; Bernd Gattermann, both of Hude, all of Fed. Rep. of Germany

[73] Assignee: Amazonenwerke H. Dreyer GmbH & Co, KG., Hasbergen-Gaste, Fed. Rep. of Germany

[21] Appl. No.: 738,153

[22] Filed: May 24, 1985

[30] Foreign Application Priority Data

May 28, 1984 [DE] Fed. Rep. of Germany ....... 3419884

[51] Int. Cl.[4] ............................................... B65G 51/36
[52] U.S. Cl. ....................................... 377/6; 73/861.41
[58] Field of Search .................. 377/6; 324/71.1, 71.4; 73/861.25, 861.04, 861.41

[56] References Cited

U.S. PATENT DOCUMENTS

| | | | |
|---|---|---|---|
| 2,760,184 | 8/1956 | Beattie | 73/861.04 |
| 3,387,119 | 6/1968 | O'Brien | 377/6 |
| 3,558,004 | 1/1971 | Boyd, Jr. | 377/6 |
| 3,694,630 | 9/1972 | Dybel | 377/6 |
| 3,906,780 | 9/1975 | Baldwin | 73/861.04 |
| 4,000,398 | 12/1976 | Conner | 377/6 |
| 4,057,709 | 11/1977 | Lyngsgaard et al. | 377/6 |
| 4,165,458 | 8/1979 | Koizumi et al. | 377/6 |

FOREIGN PATENT DOCUMENTS

| | | | |
|---|---|---|---|
| 163521 | 9/1984 | Japan | 73/861.04 |

*Primary Examiner*—John S. Heyman
*Assistant Examiner*—Karl Ohralik
*Attorney, Agent, or Firm*—Sprung Horn Kramer & Woods

[57] ABSTRACT

Method of counting particles of seed, fertilizer, and other materials employed in agriculture acoustically. The particles to be counted are conveyed against an impact plate in such a way as to start it oscillating, generating electric signals that are processed to determine the number of particles. In order to count the exact number of individual particles passing a test point with relatively high precision and by acoustical means, at least one definite oscillation amplitude that is characteristic of the impact of one particle is determined and stored and a comparable actual oscillation amplitude is determined as the particles strike against the impact plate, is compared with the stored oscillation amplitude, and, if it is shorter than the characteristic amplitude, one particle counted, or, if it is higher than the characteristic amplitude, the inference made that another particle has struck the plate.

11 Claims, 2 Drawing Figures

METHOD OF AND DEVICE FOR ACOUSTICALLY COUNTING PARTICLES

BACKGROUND OF THE INVENTION

The present invention relates to a method of acoustically counting particles of seed, fertilizer, and other materials employed in agriculture, in which the particles to be counted are conveyed against an impact plate in such a way as to start it oscillating, generating electric signals that are processed to determine the number of particles. The invention also relates to a device for carrying out a method of this type and having an impact plate that is struck by the particles to be counted, a sound transducer that converts the oscillations of the impact plate into electric signals, and a processor to process the signals.

A device of this type that operates in accordance with a method of the same generic type is described in German OS No. 2 901 767. The particles encounter a microphone that detects the noise of impact when a number of particles strike its diaphragm. Electric signals resulting from the impact noise are supplied to an amplifier that generates an output signal when the noise is loud enough. This known device makes it possible to grossly indicate larger amounts of particles. It is accordingly especially practical when the precise number of individual particles is not especially important but only the fact that particles are present at all. The method and device are not appropriate for counting individual particles, for example, seed that is to be sown.

SUMMARY OF THE INVENTION

The object of the present invention is to provide a method of and a device for counting the exact number of individual particles passing a test point with relatively high precision and by acoustical means.

This object is attained in accordance with the invention in that at least one definite oscillation amplitude that is characteristic of the impact of one particle is determined and stored and in that a comparable actual oscillation amplitude is determined as the particles strike against the impact plate, is compared with the stored oscillation amplitude, and, if it is shorter than the characteristic amplitude, one particle counted, or, if it is higher than the characteristic amplitude, the inference is made that another particle has struck the plate.

By the method in accordance with the invention, a definite oscillation amplitude that is characteristic of the impact of one particle is, in the simplest case, accordingly determined and it becomes established that one particle is present when that amplitude is detected. Further amplitudes are subsequently detected at brief intervals and compared with the characteristic amplitude. If it is then determined that an actual amplitude is higher than the characteristic amplitude that would be detected at that instant (in an equal temporal relation) for one particle, it can be inferred that another particle has struck the impact plate.

In one practical embodiment of the method a number of amplitudes characteristic of the impact of one particle that are typical of the growth or decay curve that results when one particle strikes are detected and stored and a number of amplitudes that are actually obtained from an impact and that constitute an input-signal curve are detected and compared with the characteristic growth or decay curve. Comparison of the characteristic curve with the input-signal curve will reveal whether one or more amplitudes in the input-signal curve are higher for example than the decay curve, which can be considered a particle-signal envelope. It they are higher, it can be concluded that another particle has struck against the impact surface. The advantage of this embodiment is that even weak impact pulses can be detected as particles as long as they are more powerful than the decay curve of the last particle detected.

In another practical embodiment of the method, a mean signal length is obtained from the impacts of a series of particles and the resulting signal corrected in accordance with the signal length. It has been determined that the length of the oscillation that a particle initiates upon striking the plate is characteristic of the type of particle, making it possible to detect different values when different types of particles pass through at the same time. Entering an appropriate correction parameter that depends on the length of the signal and that itself allows a criterion for determining different types of particle will make it possible to compensate for this error.

In another practical embodiment the statistical dispersion around the mean signal length is determined and corrections carried out on that basis. It has been demonstrated that correction of this type will make the results even more precise. With particles that vary greatly in size, which can lead to varying impact characteristics, the mean deviation from mean signal length will also be greater and appropriate corrections can be made.

In another practical embodiment the percentual conformity of the detected input-signal shape with a stored signal shape that is typical of a specific type of particle can be detected. This measure makes it possible to differentiate between various signal shapes that correspond to different noises, so that genuine particle signals can be filtered out.

In another practical embodiment the signal resulting from the impacting particles is tested for typical frequency components and the component frequencies thus determined are employed to differentiate between the particle signals. This is another means of separating the particles being counted from other disturbances that generate oscillations.

A device of the generic type for carrying out the method in accordance with the invention has a processor with a detection circuit in which the signals obtained from the sound transducer are assigned an impact time, a data buffer memory that the timed signals are stored in, and a processing circuit in which the stored actual signals are compared with a stored growth or decay curve. A device with these characteristics facilitates carrying out the separate steps of the method, and a small and compact device for precisely counting individual particles will especially result when the processor is a microprocessor.

In one practical embodiment of the device, the sound transducer is a piezoelectric element. It will be even more practical in this case if there are two separated and parallel impact plates with one piezoelectric element on each facing side. This establishes a negative feedback of interference noises, from the environment for example, and increases the signal-to-noise ratio between the desired and undesired signals.

In another practical embodiment of the device an amplifier and a rectifier are positioned between the piezoelectric element and the processor. The processing circuit will accordingly handle only the amplitudes of the positive (or negative) half wave.

An analog-to-digital converter can be provided to allow digital processing of the signals in the processor.

The signal obtained at the processing circuit is supplied to a counting unit connected to a correction unit. The signals from the counter can be shaped and processed in the correction unit in accordance with various other parameters like signal length.

The counting unit can be connected to a clock and the signals leaving the counting unit read out as the number of particles per unit of time. Thus, the amount of material passing through per unit of time can be obtained directly in the form of an output from the processor.

Some preferred embodiments of the invention will now be described with reference to the attached drawings, wherein:

DETAILED DESCRIPTION OF THE PREFERRED EMBODIMENTS

Figure 1:
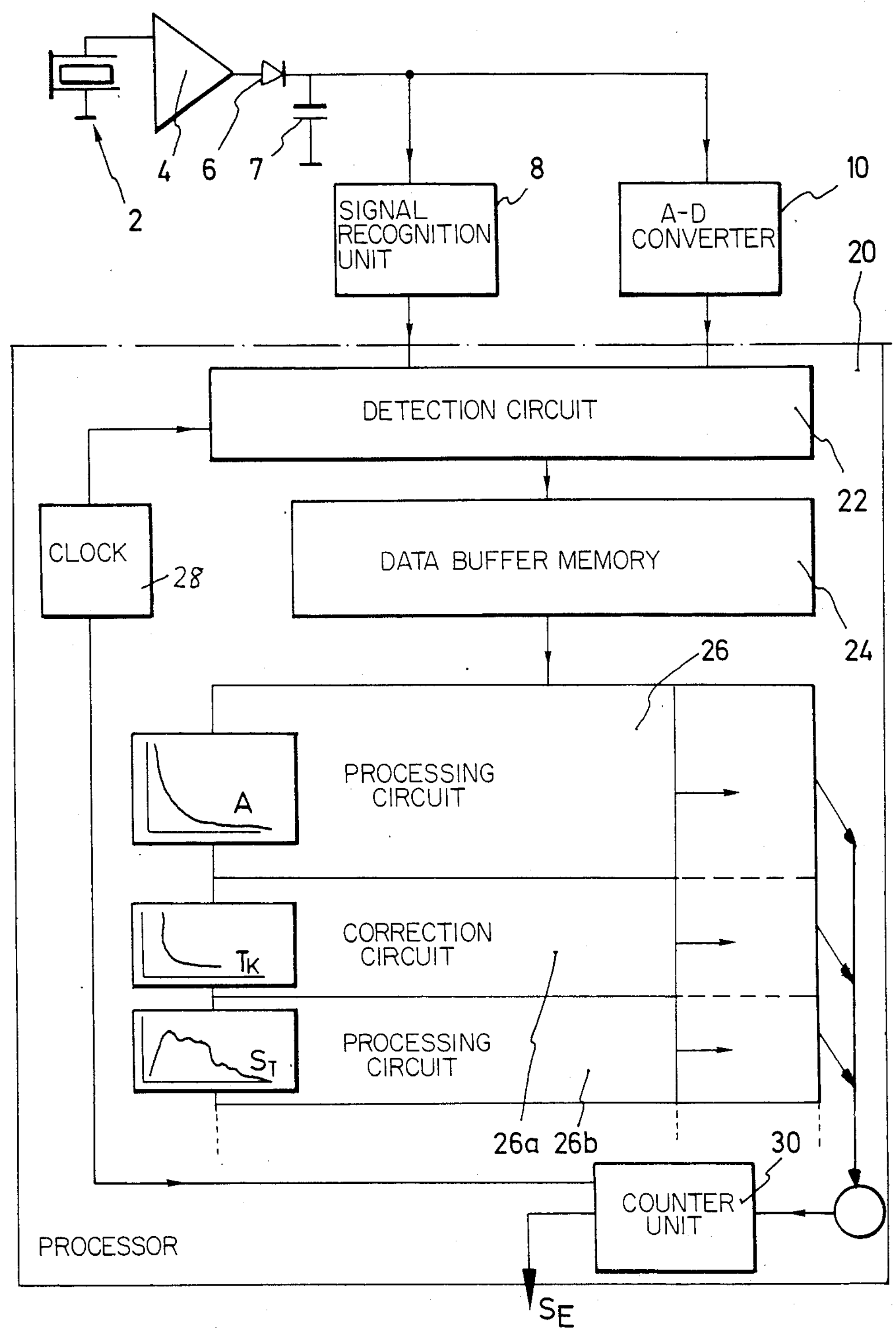
FIG. 1 is a block diagram of a device in accordance with the invention.

The device illustrated in FIG. 1 has a piezoelectric sound transducer 2. Its output signals, which occur in relation to the impact of one or more particles, are amplified and rectified by an amplifier 4 and a diode 6. The rectified signals are supplied to a signal-recognition unit 8 and a analog-to-digital converter 10. Their outputs are supplied to a detection circuit 22 in a processor 20. Processor 20, which can in practice be a microprocessor, also has a data buffer memory 24, a processing circuit 26, a correction circuit 26*a*, and another processing circuit 26*b*. Various signal analyses are carried out in processing circuits 26 or 26*a*, and additional processing circuits or modules, not illustrated, can also be connected to them.

The values obtained in processing circuits 26 and 26*b* and in correction circuit 26*a* are combined and supplied to a counter unit 30 that is connected to a clock 28.

The operation of this device will now be described.

The signals obtained at piezoelectric sound transducer 2 are amplified and rectified at points 4, 6, and 7 and the high-frequency components are filtered out. The resulting signal is supplied to signal-recognition unit 8 and analog-to-digital converter 10.

Signal-recognition unit 8 recognizes the occurrence of a signal in relation to a background level and causes a digital value equivalent to the signal level obtained from analog-to-digital converter 10 to be detected in detection circuit 22. To eliminate the necessity of processing all signal data, only the amplitudes or oscillation maxima of the individual oscillations are detected digitally, correlated to the time of occurrence by clock 28, and stored in data buffer memory 24.

Figure 2:
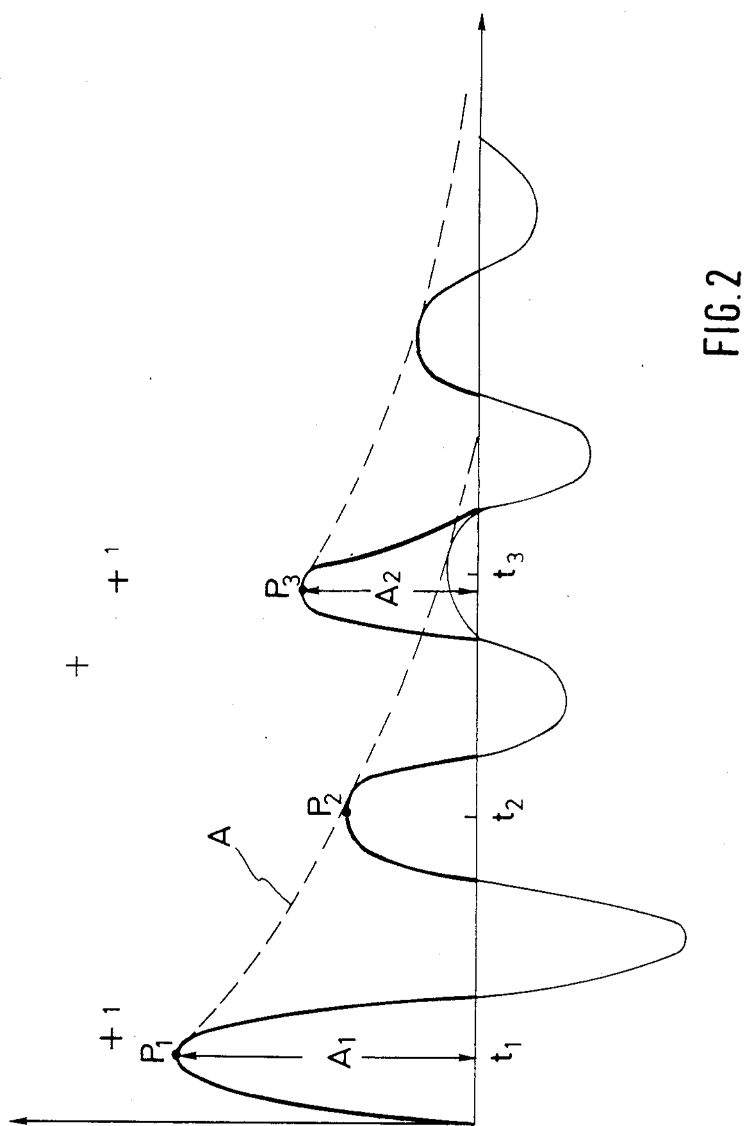
FIG. 2 a graph illustrating the method in accordance with the invention.

Stored in buffer memory 24, accordingly, are the maxima of the oscillations obtained during each scanning cycle. Three points, $P_1$, $P_2$, and $P_3$, of the type obtained in this way are illustrated in FIG. 2. Thus, an input-signal curve is determined over times $t_1$, $t_2$, and $t_3$ and temporarily stored in data buffer memory 24.

A previously determined characteristic decay curve A that is typical of one particle is stored in processing circuit 26. Curve A is also illustrated in FIG. 2. Decay curve A is now compared with the temporarily stored input-signal curve. (It is of course also possible to store a characteristic growth curve and compare the actual growth with it.)

The situation illustrated in FIG. 2 demonstrates that, although the points $P_1$ and $P_2$ obtained at times $t_1$ and $t_2$ are located within the envelope of stored characteristic curve A, the amplitude point $P_3$ obtained at time $t_3$ is higher than it would be if only one particle had struck the impact plate. Thus, another oscillation maximum occurs within the decay time typical of one particle and is accordingly detected. The occurrence of such maxima implies that another particle has struck the impact plate. These other particles are accordingly detected and counted.

The count signal obtained in this way can then be further refined and improved. Thus, for example, a signal shape $S_T$ typical of a specific type of particle can be stored in another correction circuit 26*a*. The measured signals can be compared with this typical signal for percentual conformity in order to differentiate between different types of noise. Thus, genuine particle signals can be distinguished from noise or other interference signals.

When, accordingly, although a signal exhibits a typical decay as stored by means of curve A in processing circuit 26, comparison indicates that the characteristic signal shape is absent, the signal will not be included in the count because the particle is of a different type and not one of those that are to be counted.

Another potential for additional analysis is embodied in an additional processing module, not illustrated, that tests the resulting signals for typical frequency components. Once component-frequency parameters that are also typical of the impacting particles have been determined, these typical frequency components can be exploited to differentiate between different types of particle.

Since there is a fixed relation between the dimension of the signals and the absolute counting errors, this can be taken into account in a correction circuit 26*a*, in which a correction table $T_K$ essentially representing a correction factor as a function of the signals and signal amplitudes has been stored. The resulting grain count is corrected in accordance with the corresponding correction factor.

The accordingly corrected and selected count signals are then converted into a grains-per-time resultant signal $S_E$ by unit 30, which is connected to clock 28.

It will be appreciated that the instant specification and claims are set forth by way of illustration and not limitation, and that various modifications and changes may be made without departing from the spirit and scope of the present invention.

What is claimed is:

1. In a method of acoustically counting particles of seed, fertilizer, and other materials employed in agriculture, wherein the particles to be counted are conveyed against an impact plate to start the plate oscillating, electric signals are generated in response to the oscillations which have a characteristic growth or decay curve defined by a number of oscillation amplitude maxima and the signals are processed to determine the number of particles contacting the plate, the improvement wherein the step of processing comprises determining and storing a number of oscillation amplitude maxima that are characteristic of the impact of a typical particle to obtain a reference growth or decay curve detecting a number of actual amplitude maxima that are actually obtained as particles strike against the impact plate and comparing each number of actual amplitude maxima with the stored reference growth or decay curve and indicating one particle when the actual amplitude maxima are within the stored reference growth or decay curve and indicating more than one particle when the actual amplitude maxima are outside of the stored reference growth or decay curve.

2. The method as in claim 1, wherein the signal resulting from the impacting particles is tested for typical frequency components and the component frequencies thus determined are employed to differentiate between the particle signals.

3. The method as in claim 1, wherein a mean signal length is obtained from the impacts of a series of particles and the resulting signal corrected in accordance with the signal length.

4. The method as in claim 3, further comprising determining a statistical dispersion around the mean signal length and carry out corrections on that basis.

5. The method as in claim 3, wherein the percentual conformity of the detected input-signal shape with a stored signal shape that is typical of a specific type of particle is detected.

6. In a device for acoustically counting particles having an impact plate against which particles are conveyed to impart oscillations thereto, a transducer for producing signals in response to the oscillations, the signals having a characteristic growth or decay curve defined by a number of oscillation amplitude maxima, and means for processing the signals to determine the number of particles contacting the plate, the improvement wherein the processing means comprises: means for storing a reference growth or decay curve characteristic of the impact of a typical particle; means for detecting a number of actual amplitude maxima as particles contact the plate and means for comparing each number of actual amplitude maxima with the stored reference growth or decay curve to indicate one particle when the actual amplitude maxima are within the stored reference curve and to indicate more than one particle when actual amplitude maxima are outside of the stored reference growth or decay curve.

7. The device as in claim 6, wherein the transducer is a piezoelectric element.

8. The device as in claim 7, wherein an amplifier and a rectifier are positioned between the piezoelectric element and the processing means.

9. The device as in claim 6, further comprising an analog-to-digital converter digitally processing the signals from the transducer.

10. The device as in claim 6, further comprising a counting unit connected to the comparing means.

11. The device as in claim 10, further comprising a clock connected to the counting unit which has means for producing signals representing the number of particles per unit of time.

* * * * *